(12) United States Patent
Terashima et al.

(10) Patent No.: US 10,974,719 B2
(45) Date of Patent: Apr. 13, 2021

(54) MOBILE OBJECT CONTROL SYSTEM, MOBILE OBJECT CONTROL METHOD, AND PROGRAM

(71) Applicant: RENESAS ELECTRONICS CORPORATION, Tokyo (JP)

(72) Inventors: Kazuaki Terashima, Buckinghamshire (GB); Yuki Kajiwara, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 230 days.

(21) Appl. No.: 16/031,789

(22) Filed: Jul. 10, 2018

(65) Prior Publication Data

US 2019/0039607 A1     Feb. 7, 2019

(30) Foreign Application Priority Data

Aug. 2, 2017   (JP) .............................. JP2017-149853

(51) Int. Cl.
  B60W 30/09     (2012.01)
  G05D 1/02       (2020.01)
  (Continued)

(52) U.S. Cl.
  CPC ............. *B60W 30/09* (2013.01); *B60Q 5/006* (2013.01); *B60T 7/18* (2013.01); *B60T 7/22* (2013.01);
  (Continued)

(58) Field of Classification Search
  None
  See application file for complete search history.

(56) References Cited

U.S. PATENT DOCUMENTS

| | | | |
|---|---|---|---|
| 6,842,684 B1 * | 1/2005 | Kade | B60W 10/18 701/70 |
| 8,473,144 B1 * | 6/2013 | Dolgov | B60W 30/18163 701/28 |

(Continued)

FOREIGN PATENT DOCUMENTS

| | | |
|---|---|---|
| JP | 2012-123296 A | 6/2012 |
| JP | 2015-219745 A | 12/2015 |
| WO | 2014/047250 A1 | 3/2014 |

OTHER PUBLICATIONS

Extended European Search Report issued in corresponding European Patent Application No. 18184448.1-1204, dated Dec. 14, 2018.

*Primary Examiner* — Kenny S Lin
(74) *Attorney, Agent, or Firm* — McDermott Will & Emery LLP

(57) ABSTRACT

A mobile object control system has an SfM unit detecting distance to an object imaged by a monocular camera by using the SfM algorithm, a first-stop-position output unit outputting a first stop position, a second-stop-position calculating unit calculating a second stop position closer than the first stop position, and a control unit controlling travel of a mobile object. The control unit controls the mobile object so as to stop at the second stop position. When a predetermined starting condition is satisfied, the control unit controls the mobile object so as to start. The SfM unit detects the distance to an object by using an image captured by the monocular camera after the mobile object starts. When a result of detection of the distance of the object by the SfM unit is obtained, the control unit uses the detection result for control of the travel.

14 Claims, 14 Drawing Sheets

(51) Int. Cl.
  *G05D 1/00*   (2006.01)
  *B60Q 5/00*   (2006.01)
  *B60T 7/18*   (2006.01)
  *B60T 8/17*   (2006.01)
  *G06K 9/00*   (2006.01)
  *B60T 7/22*   (2006.01)

(52) U.S. Cl.
  CPC .............. *B60T 8/17* (2013.01); *G05D 1/0055* (2013.01); *G05D 1/0088* (2013.01); *G05D 1/0246* (2013.01); *G05D 1/0253* (2013.01); *G06K 9/00805* (2013.01); *B60T 2201/022* (2013.01); *G05D 2201/0213* (2013.01)

(56) References Cited

U.S. PATENT DOCUMENTS

| | | |
|---|---|---|
| 9,201,424 B1 | 12/2015 | Ogale |
| 9,558,584 B1 * | 1/2017 | Lo .................... G06T 15/205 |
| 2007/0255498 A1 * | 11/2007 | McDaniel ............ G01S 13/931 |
| | | 701/301 |
| 2008/0215231 A1 * | 9/2008 | Breed .................... G08G 1/161 |
| | | 701/117 |
| 2011/0228986 A1 | 9/2011 | Seyffarth et al. |
| 2012/0147150 A1 | 6/2012 | Kojima et al. |
| 2015/0086080 A1 * | 3/2015 | Stein ...................... H04N 7/183 |
| | | 382/104 |
| 2016/0214612 A1 * | 7/2016 | Kashiba .......... B60W 30/18163 |
| 2016/0358477 A1 * | 12/2016 | Ansari ................ G06Q 30/0251 |
| 2017/0019657 A1 * | 1/2017 | Livyatan ................. G06T 7/579 |
| 2017/0057412 A1 * | 3/2017 | Payne ...................... G08G 1/22 |
| 2017/0113608 A1 * | 4/2017 | Patel .................. G06K 9/00805 |
| 2018/0052463 A1 * | 2/2018 | Mays ........................ B60T 7/18 |
| 2018/0101739 A1 * | 4/2018 | Zhang ................ G06K 9/00805 |
| 2018/0120858 A1 * | 5/2018 | Perez Barrera .... G06K 9/00228 |
| 2018/0149742 A1 * | 5/2018 | Izadian ................ H01Q 1/1264 |
| 2018/0357772 A1 * | 12/2018 | Takemura ........... G06K 9/00805 |

\* cited by examiner

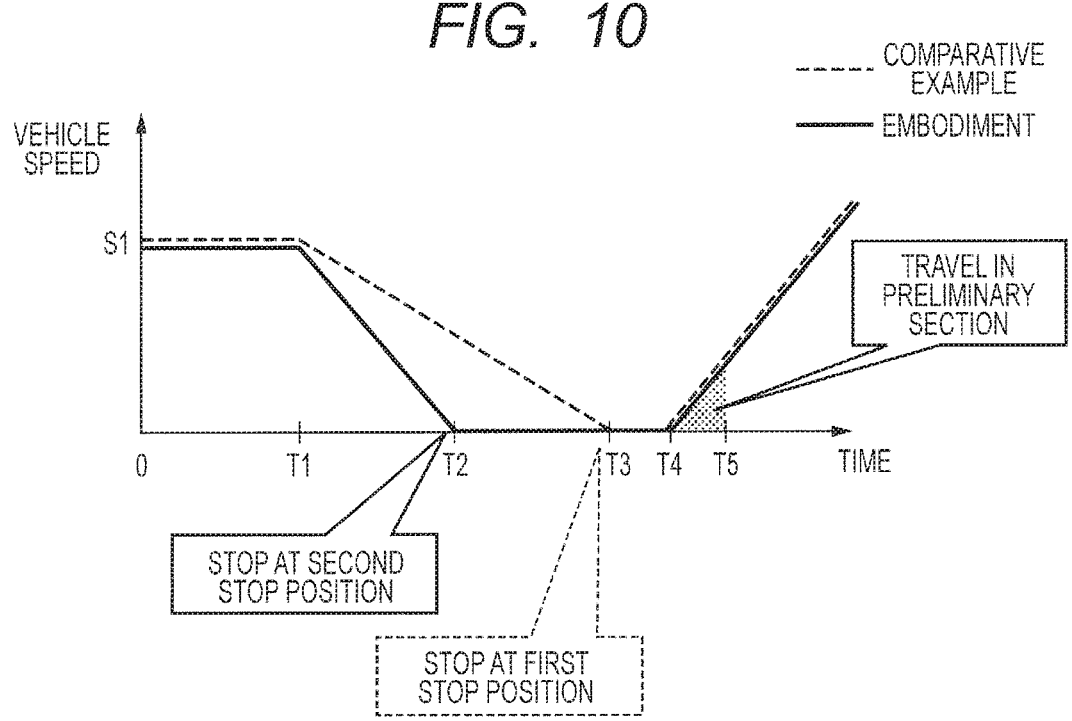
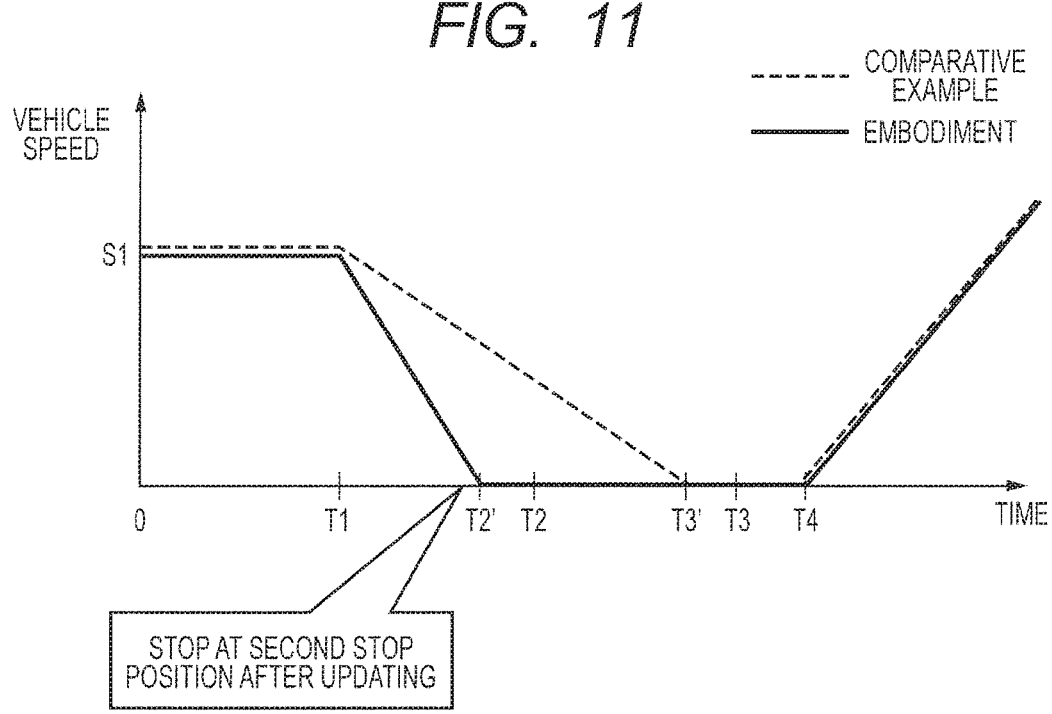

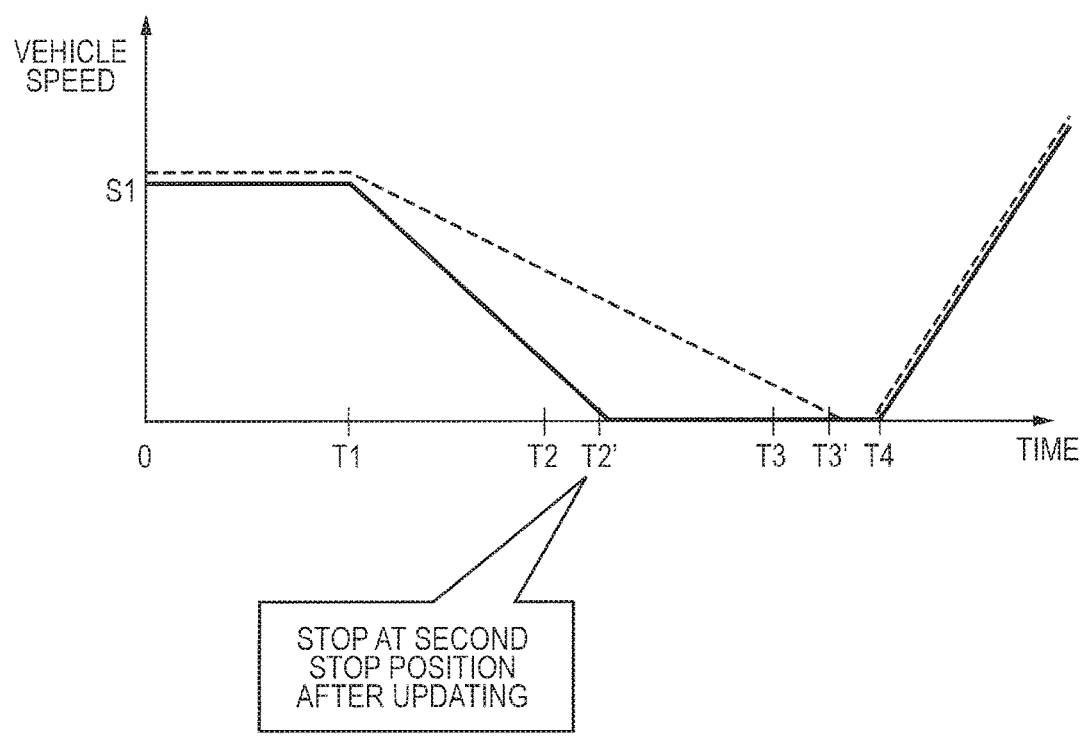

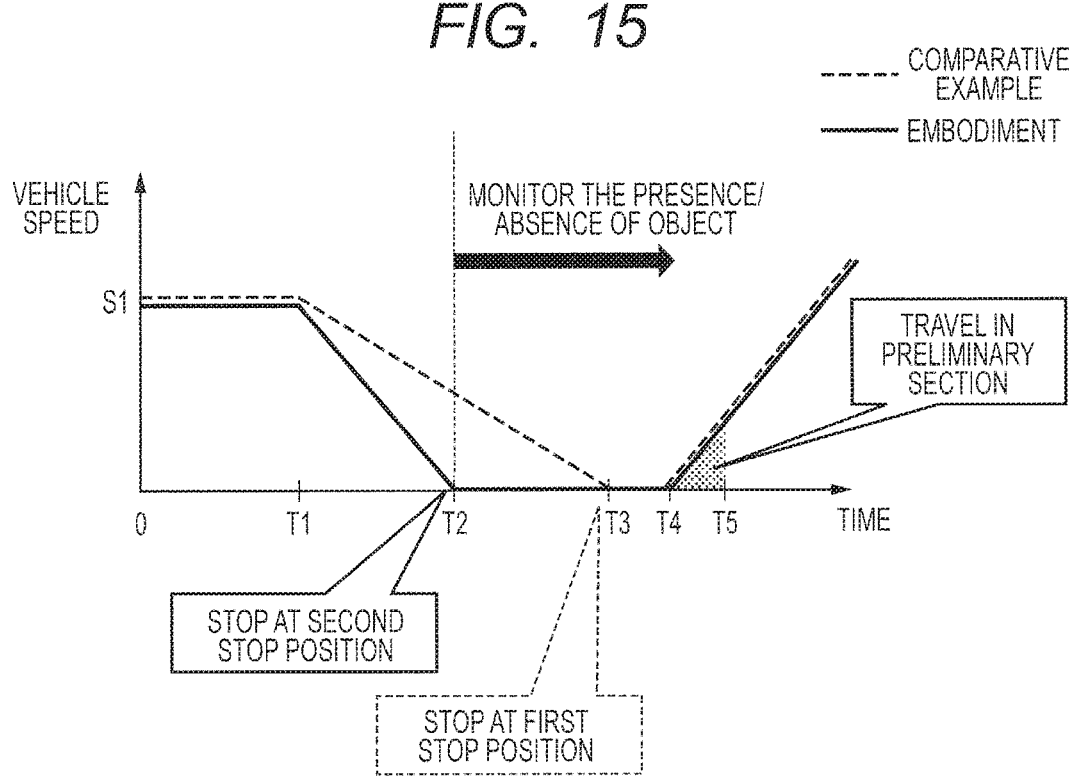
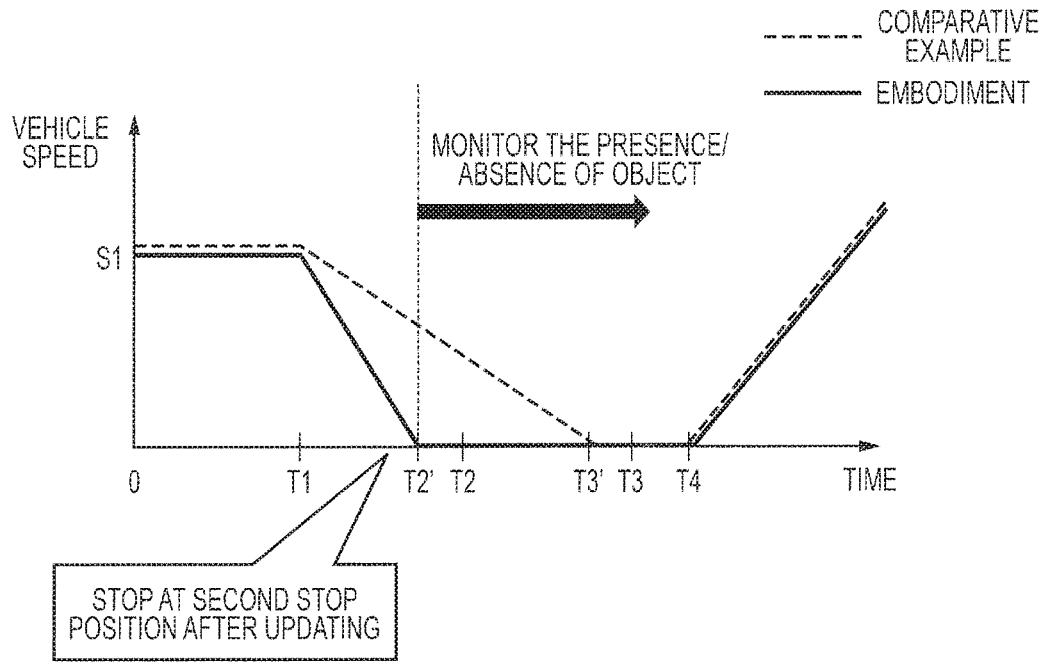

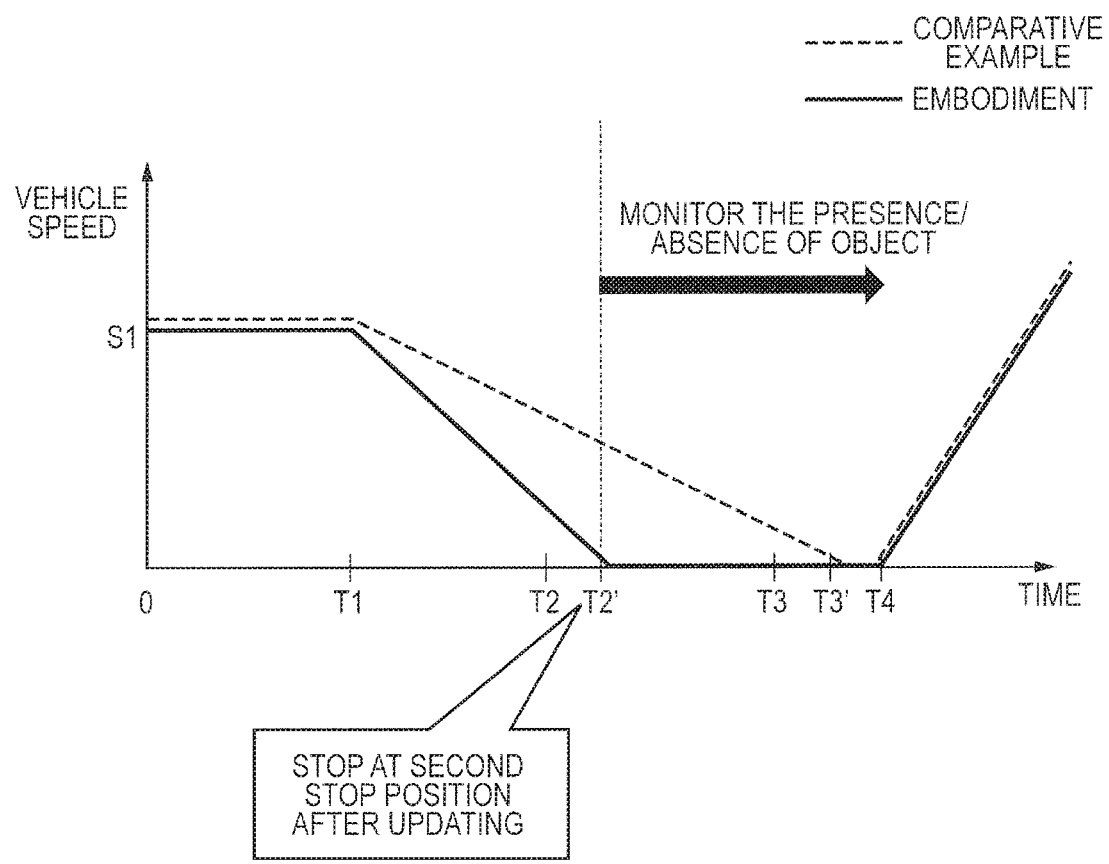

MOBILE OBJECT CONTROL SYSTEM, MOBILE OBJECT CONTROL METHOD, AND PROGRAM

CROSS-REFERENCE TO RELATED APPLICATIONS

The disclosure of Japanese Patent Application No. 2017-149853 filed on Aug. 2, 2017 including the specification, drawings and abstract is incorporated herein by reference in its entirety.

BACKGROUND

The present invention relates to a mobile object control system, a mobile object control method, and a program and, for example, relates to a mobile object control system, a mobile object control method, and a program accompanying distance detection using an SfM algorithm.

In recent years, attention is being paid to a technique of detecting distance to an object by using a camera. In a technique using a stereo camera, distance can be measured by using the parallax of two cameras facing in the same direction. Since a stereo camera has two cameras, the cost is high. Consequently, various methods of measuring distance without using a stereo camera have been proposed.

As one of them, SfM (Structure from Motion) as an algorithm capable of measuring distance to an object by using a monocular camera is known. The SfM is an image processing algorithm of estimating the position of a monocular camera by performing detection of distance to an object and object's motion detection on the basis of an image obtained by the monocular camera.

Regarding this, for example, Patent Literature 1 (Japanese Unexamined Patent Application Publication No. 2015-219745) discloses a technique of calculating a camera position by using the SfM and generating a three-dimensional map. Patent Literature 2 (Japanese Unexamined Patent Application Publication No. 2012-123296) discloses a technique of detecting a photographic-subject distance by using both distance detection by a stereo camera and distance detection using the SfM.

In the case of providing an in-vehicle device with the image processing technique using the SfM, detection of the motion of an object other than one's vehicle, detection of the distance between the object other than the one's vehicle and the vehicle, and estimation of the position of the vehicle can be performed. Objects other than one's vehicle include stationary objects and mobile objects such as other vehicles and humans. Until now, it is regarded that the precision of the distance detection using the SfM is insufficient. However, the sufficiency of precision is being improved by increase in the number of pixels which are input and device of processes. Consequently, an application technique of the distance detection using the SfM is being expected.

SUMMARY

The SfM uses, basically, a plurality of images captured while changing the point of view of a camera for processes. Specifically, with respect to a camera mounted in a vehicle, a change in the point of view of the camera corresponds to a motion of the vehicle. Consequently, in the distance detection using a monocular camera and the SfM, the distance to an object cannot be detected in a state where the vehicle stops. It means that the distance to a stationary object cannot be detected. When the object is moving, although the vehicle stops, the distance to the object can be detected. It is because the position of the object changes in place of the change in the point of view of the camera. That is, in a state where the vehicle is stationary, the distance detection using the SfM cannot be performed on a stationary object.

Consequently, in the case where the vehicle stops in a stop position satisfying a predetermined safety criterion and, after that, starts again from the stop position, a distance detection result by the SfM is obtained after travel only by a predetermined distance L over the stop position. Use of the distance detection result by the SfM for a control on the travel of the vehicle is unpreferable for the following reason. The fact that the distance detection result by the SfM cannot be obtained until the vehicle travels only by the predetermined distance L means that the vehicle travels ahead of the stop position satisfying the predetermined safety criterion in a state where grasp of the environment is insufficient.

The other objects and novel features will become apparent from the description of the specification and appended drawings.

According to an embodiment, a mobile object control system has a second-stop-position calculating unit calculating a second stop position closer than a first stop position satisfying a predetermined safety criterion and a control unit controlling travel of the mobile object. The control unit controls so that the mobile object stops at the second stop position and, when a predetermined starting condition is satisfied, controls so that the mobile object starts from the second stop position. The SfM unit detects a distance to an object by using an image captured by a monocular camera after the mobile object starts from the second stop position.

According to the embodiment, travel ahead of a stop position satisfying a predetermined safety criterion can be controlled by using a distance detection result by the SfM algorithm.

BRIEF DESCRIPTION OF THE DRAWINGS

FIG. 10 is a diagram illustrating an operation example of a car whose travel is controlled by the vehicle control system according to the first embodiment and an operation example of a car whose travel is controlled by a vehicle control system according to a comparative example.

FIG. 11 is a graph illustrating an operation example of a car in the case where a first stop position is changed to a position closer than the original first stop position.

FIG. 12 is a graph illustrating an operation example of a car in the case where the first stop position is changed to a position further than the original first stop position.

FIG. 15 is a diagram illustrating an operation example of a car whose travel is controlled by the vehicle control system according to the second embodiment and an operation example of a car whose travel is controlled by a vehicle control system according to a comparison example.

FIG. 16 is a graph illustrating an operation example of a car in the case where a first stop position is changed to a position closer than the original first stop position.

FIG. 17 is a graph illustrating an operation example of a car in the case where the first stop position is changed to a position further than the original first stop position.

DETAILED DESCRIPTION

Figure 1:
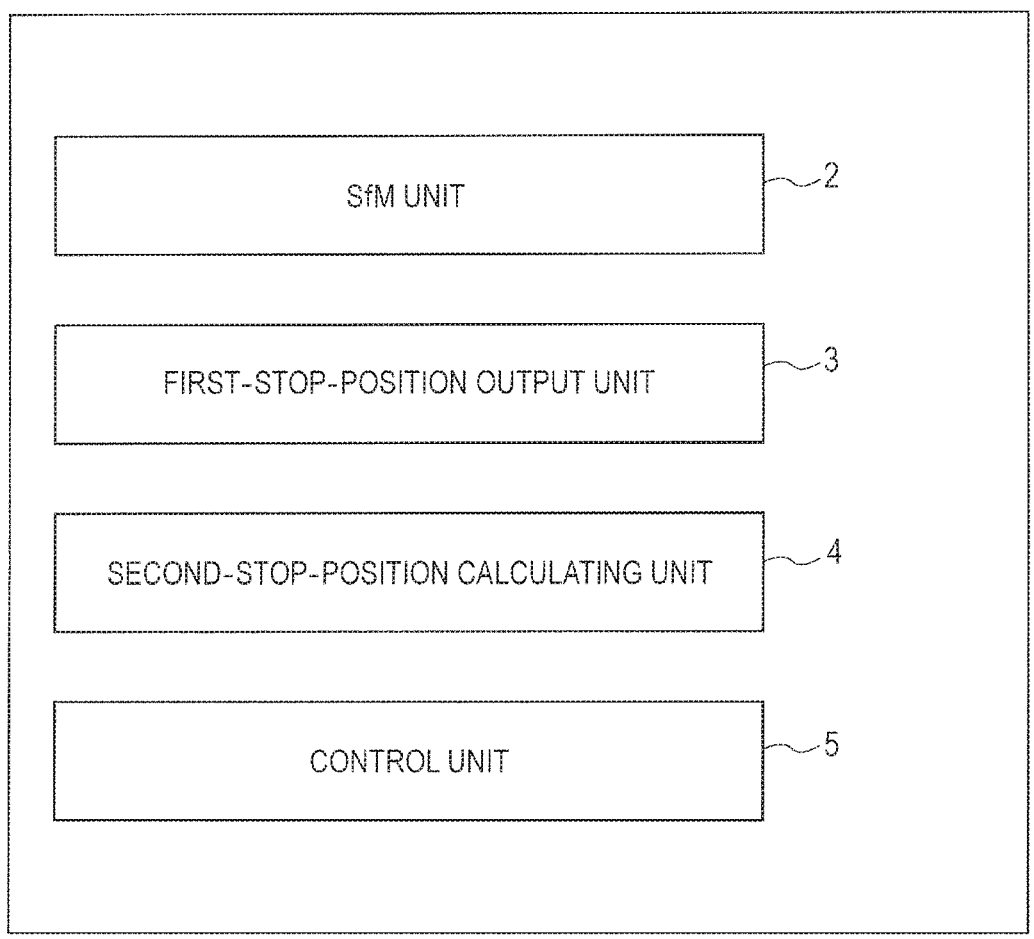
FIG. 1 is a block diagram illustrating an example of the configuration of a mobile object control system according to the outline of an embodiment.

To make description clear, omission and simplification is made properly in the following description and drawings. In the drawings, the same reference numeral is designated to the same components, and repetitive description will not be given as necessary.

Outline of Embodiments

Prior to description of the details of embodiments, first, outline of the embodiments will be described. FIG. 1 is a block diagram illustrating an example of the configuration of a mobile object control system 1 according to the outline of an embodiment. The mobile object control system 1 has an SfM unit 2, a first-stop-position output unit 3, a second-stop-position calculating unit 4, and a control unit 5. The mobile object control system 1 is, for example, a system which is mounted on a mobile object such as a car and controls movement of the mobile object. The mobile object is not limited to a car but may be a mobile robot or the like.

The SfM unit 2 detects the distance to an object captured by a monocular camera which images the forward in the travel direction of the mobile object by using the SfM algorithm. The monocular camera is provided for the mobile object so as to image the forward in the travel direction of the mobile object. By performing a process according to the SfM algorithm on an image obtained by the monocular camera, the SfM unit 2 detects the distance to the object which is imaged. The object is any of subjects including a sign written on a road surface.

The first-stop-position output unit 3 outputs a first stop position satisfying a predetermined safety criterion. More specifically, the first-stop-position output unit 3 outputs a stop position ahead of the present position of a mobile object which is travelling as a first stop position. An example of the first stop position is a stop line provided at an intersection (that is, a line written on a road closer than an intersection and expressing a vehicle stop position). However, it is not limited to a stop line but may be a stop position requesting a mobile object to satisfy a predetermined safety criterion. For example, the first stop position may be a position apart from a preceding vehicle which is being stopped only by a predetermined distance. The predetermined safety criterion may be a criterion determined by a law, a criterion determined by any standard, or a criterion uniquely determined by a company (for example, a car maker or the like). The first-stop-position output unit 3 outputs the stop position ahead of the present position of the mobile object which is traveling as the first stop position.

To output the first stop position, it is sufficient for the first-stop-position output unit 3 to obtain the first stop position by an arbitrary obtaining process. For example, the first stop position may be output on the basis of information received from a communication device which is provided for a road and transmits information indicating the first stop position to a mobile object or a stop position (for example, the position of a stop line) detected on the basis of information from a monocular camera or another sensor may be output as the first stop position. The position instructed from the user who rides on a vehicle may be output as the first stop position.

The second-stop-position calculating unit 4 calculates a second stop position closer than the first stop position output from the first-stop-position output unit 3. For example, the second-stop-position calculating unit 4 sets a position closer than the first stop position only by a predetermined distance as the second stop position.

The control unit 5 controls the travel of the mobile object. When the second stop position is calculated by the second-stop-position calculating unit 4, the control unit 5 controls the mobile object so that the mobile object stops at the second stop position. When a predetermined starting condition is satisfied after the mobile object stops at the second stop position, the control unit 5 controls the mobile object so that the mobile object starts from the second stop position. When a detection result of the distance of the object by the SfM unit 2 is obtained, the control unit 5 uses the detection result for control of the travel of the mobile object. It is sufficient for the control unit 5 to perform an arbitrary control as the control using the detection result of the distance of the object by the SfM unit 2. For example, although the control unit 5 may perform control of a vehicle so that the distance to another vehicle traveling forward maintains a proper value, the control using the detection result of the distance of the object by the SfM unit 2 is not limited to the control.

In the SfM algorithm, when a camera moves, regardless of whether an object to be imaged is a still object or a mobile object, the distance to the object can be detected. Consequently, when the mobile object starts from the second stop position, the SfM unit 2 detects the distance to the object by using an image captured by a monocular camera. That is, the SfM unit 2 detects the distance to the object by using an image captured after start from the second stop position. Consequently, at the time point the mobile object exists closer than the first stop position, the control unit 5 becomes to be able to use the detection result by the SfM unit 2.

Figure 2:
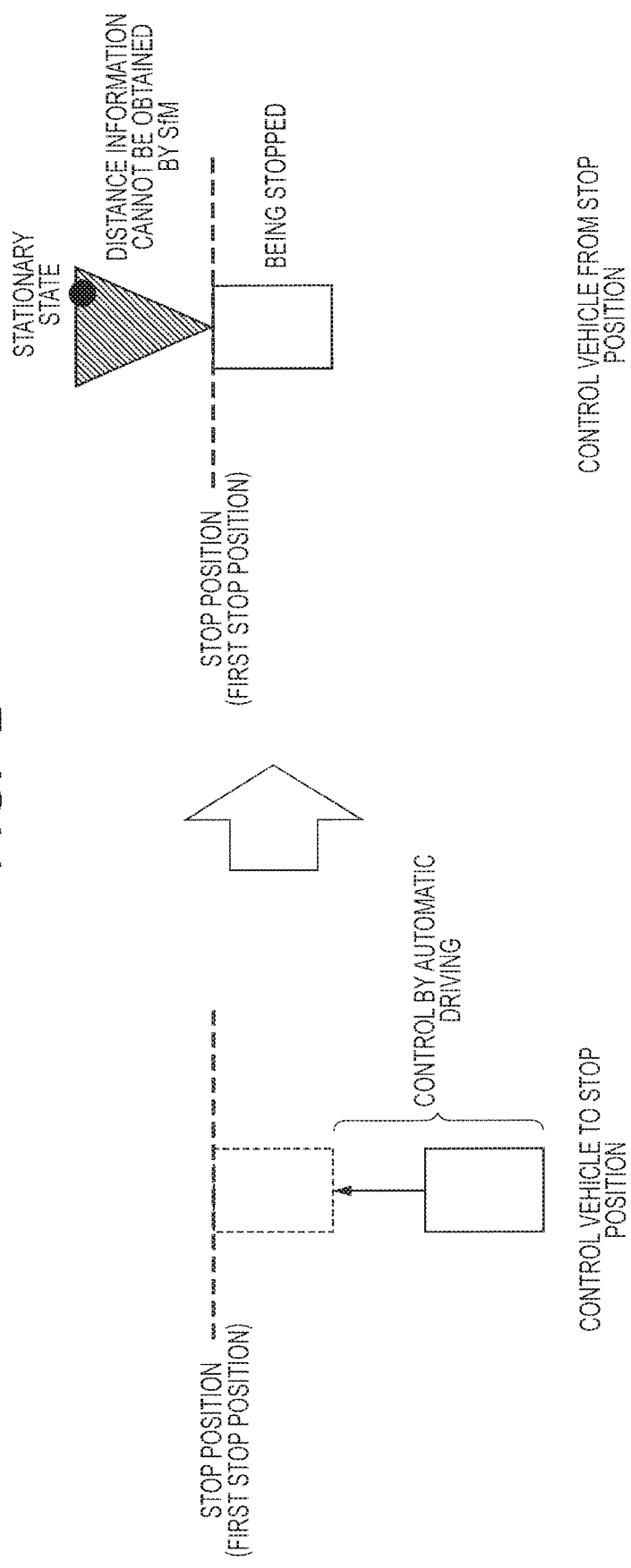
FIG. 2 is a schematic diagram explaining the operation of a mobile object control system according to a comparative example.
Figure 3:
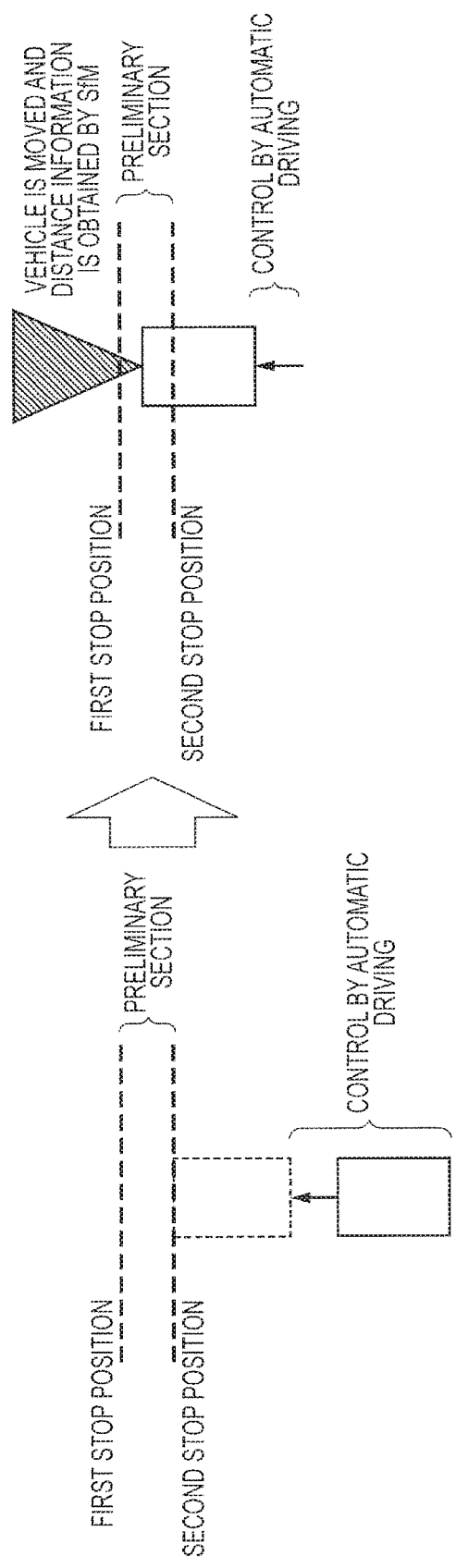
FIG. 3 is a schematic diagram explaining the operation of a mobile object control system according to the outline of the embodiment.

An effect of the mobile object control system 1 will be described together with a comparative example. Description will be given on assumption that the mobile object is a vehicle performing automatic driving. FIG. 2 is a schematic diagram explaining the operation of a mobile object control system according to a comparative example. FIG. 3 is a schematic diagram explaining the operation of the mobile object control system 1. As illustrated in FIG. 3, the section between the first stop position and the second stop position is called a preliminary section.

In the mobile object control system according to the comparative example, travel of a vehicle in which the system is mounted is controlled by automatic driving so that the vehicle stops at a stop position satisfying a predetermined safety criterion, that is, the first stop position. When the vehicle is being stopped, as described above, the detection of distance to a stationary object by using the SfM algorithm cannot be performed. When the vehicle starts again and moves only by a predetermined movement distance required by the SfM algorithm, the detection of distance to a stationary object becomes possible. However, in the mobile object control system according to the comparative example, since the vehicle stops at the first stop position, the vehicle travels ahead of the first stop position in a state where the distance detecting process by the SfM algorithm is not performed. That is, in a state where grasp of the environment is insufficient, the vehicle is allowed to travel ahead of the first stop position as a reference line satisfying the predetermined safety criterion.

On the other hand, the mobile object control system 1 operates as follows. As described above, in the mobile object control system 1, the second stop position closer than the first stop position is calculated and the travel by automatic driving is controlled so that the vehicle stops in the second stop position. In the mobile object control system 1, after the vehicle is stopped in the second stop position, when a predetermined starting condition is satisfied, the vehicle is controlled so as to start from the second stop position. That is, first, the vehicle travels in a preliminary section. In the preliminary section, the detection of distance to an object by using the SfM algorithm becomes possible. That is, before reaching the first stop position, a result of the distance detection by the SfM unit 2 can be used. Therefore, according to the mobile object control system 1, the travel ahead of the first stop position as the reference line satisfying the predetermined safety criterion can be controlled in a state where the predetermined safety criterion is satisfied by using a result of the distance detection by the SfM unit 2.

In the mobile object control system 1, not only the above-described effect, the following effect is also produced. As the distance detection is performed using a monocular camera not a stereo camera in the mobile object control system 1, the cost can be reduced as compared with the case using a stereo camera.

First Embodiment

Figure 4:
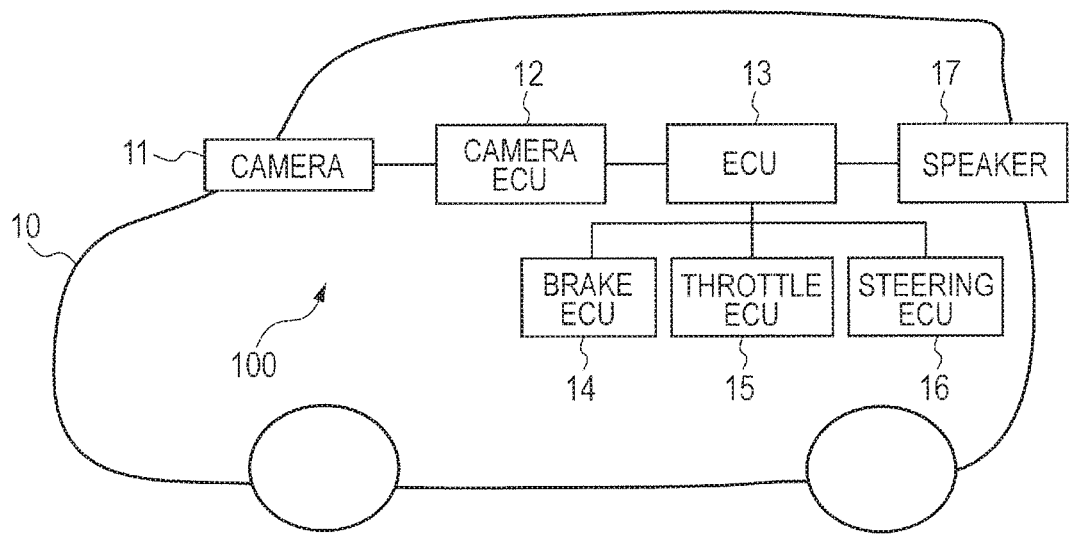
FIG. 4 is a block diagram illustrating an example of a hardware configuration of a vehicle control system according to a first embodiment.

Next, the details of an embodiment will be described. FIG. 4 is a block diagram illustrating an example of a hardware configuration of a vehicle control system 100 according to a first embodiment. The vehicle control system 100 is an example of the above-described mobile object control system 1 and is a system mounted in a car 10 and controlling travel of the car 10.

As illustrated in FIG. 4, the vehicle control system 100 has a camera 11, a camera ECU (Electronic Control Unit) 12, an ECU (Electronic Control Unit) 13, a brake ECU (Electronic Control Unit) 14, a throttle ECU (Electronic Control Unit) 15, a steering ECU (Electronic Control Unit) 16, and a speaker 17.

The camera 11 is a monocular camera and provided for the car 10 so as to capture images in the movement direction of the car 10. In the example illustrated in FIG. 4, concretely, the camera 11 is provided in the front part of the car 10 so as to capture images ahead of the car 10.

The camera ECU 12 is an ECU which obtains an image captured by the camera 11 and performs image process including SfM. The ECU 13 is an ECU which controls the travel of the car 10 using a result of the process of the camera ECU 12. The ECU 13 outputs a control signal to the brake ECU 14, the throttle ECU 15, and the steering ECU 16. The ECU 13 sends a predetermined output to the speaker 17 as necessary. For example, a notification according to the process result of the ECU 13 is output from the speaker 17. The brake ECU 14 is an ECU controlling the braking operation of the car 10 and controls a brake (not illustrated) in accordance with a control signal from the ECU 13. The throttle ECU 15 is an ECU controlling the accelerating operation of the car 10 and controls an accelerator (not illustrated) in accordance with a control signal from the ECU 13. The steering ECU 16 is an ECU controlling the steering operation of the car 10 and controls a steering (not illustrated) in accordance with a control signal from the ECU 13.

Figure 5:
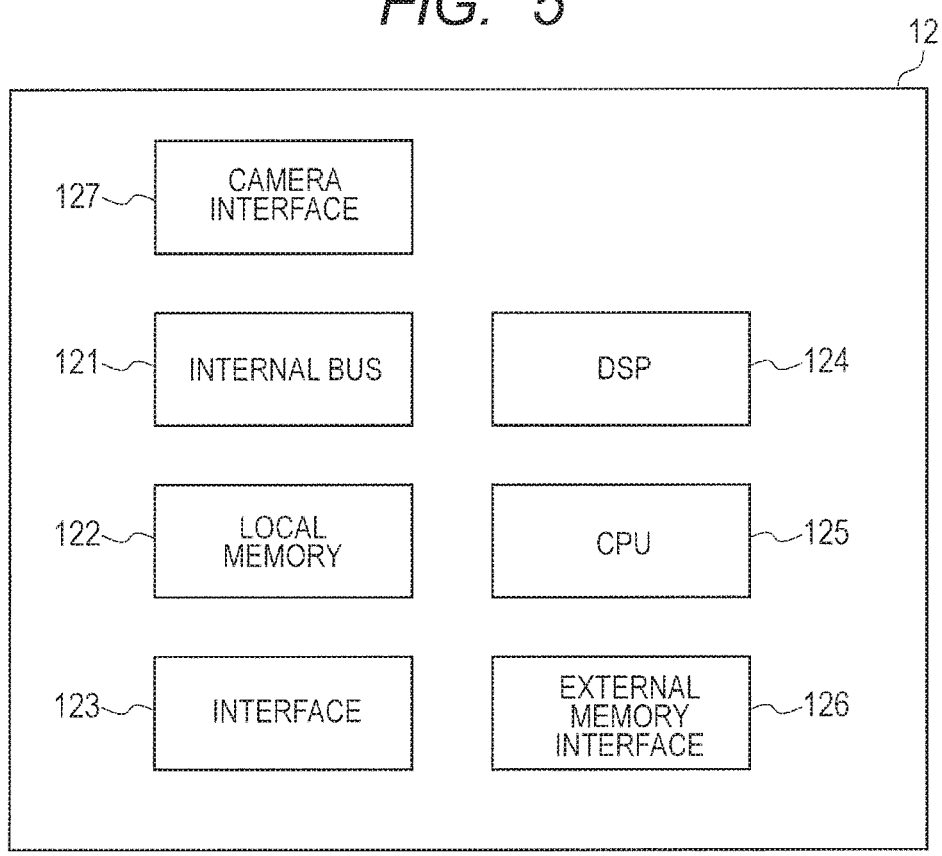
FIG. 5 is a block diagram illustrating an example of the configuration of a camera ECU.
Figure 6:
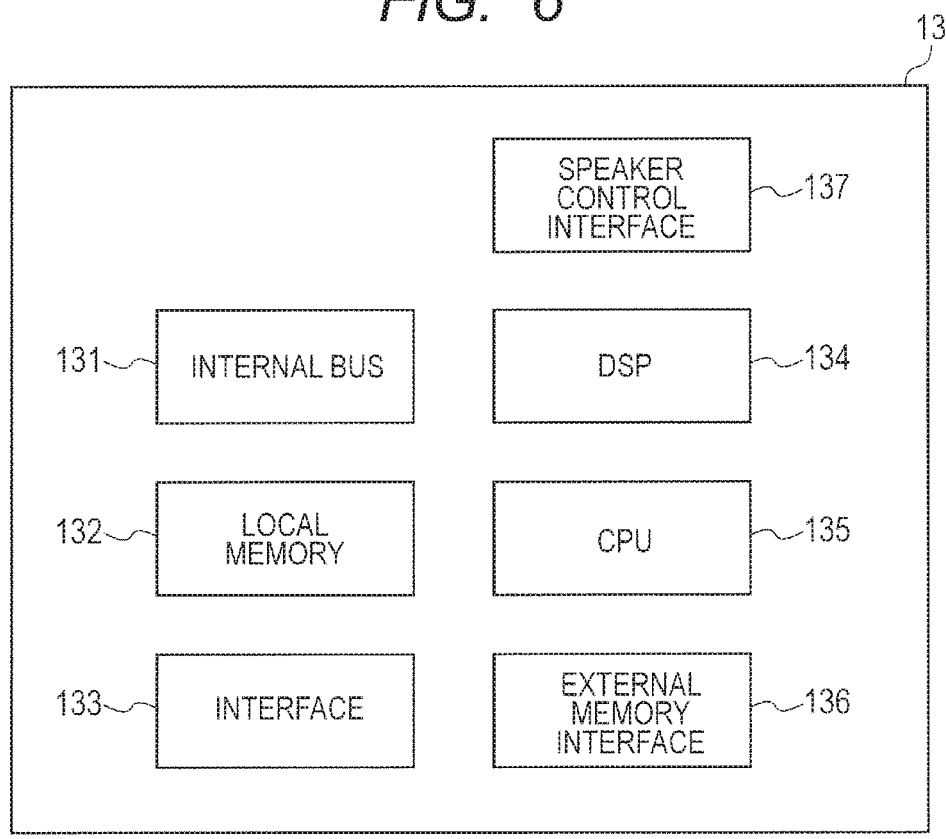
FIG. 6 is a block diagram illustrating an example of the configuration of an ECU.

Next, the configuration of the camera ECU 12 and the configuration of the ECU 13 will be described. FIG. 5 is a block diagram illustrating an example of the configuration of the camera ECU. FIG. 6 is a block diagram illustrating an example of the configuration of the ECU 13. As illustrated in FIG. 5, the camera ECU 12 has an internal bus 121, a local memory 122, an interface 123, a DSP (Digital Signal Processor) 124, a CPU (Central Processing Unit) 125, an external memory interface 126, and a camera interface 127. As illustrated in FIG. 6, the ECU 13 has an internal bus 131, a local memory 132, an interface 133, a DSP 134, a CPU 135, an external memory interface 136, and a speaker control interface 137.

The internal buses 121 and 131 are buses on the inside of an SoC (System-on-a-chip). Via the internal bus 121, the modules in the camera ECU 12 perform data communications. Via the internal bus 131, the modules in the ECU 13 perform data communications.

The local memories 122 and 132 are memories in the SoC. That is, the local memory 122 is a memory provided on the inside of the camera ECU 12, and the local memory 132 is a memory provided on the inside of the ECU 13. The local memories 122 and 132 are, for example, SRAMs (Static Random Access Memories). The local memories 122 and 132 are disposed on the buses and are accessed by each of the modules to store or refer data. A plurality of local memories 122 and 132 may be provided.

The interfaces 123 and 132 are interfaces for communication with the outside. That is, the interface 123 is an interface for coupling the camera ECU 12 and another device (for example, the ECU 13). The interface 133 is an interface for coupling the ECU 13 and another device (for example, the camera ECU 12). The interfaces 123 and 133 may be analog interfaces or digital interfaces and may be interfaces determined by an arbitrary communication standard.

The DSPs 124 and 134 are processors for image process. The CPUs 125 and 135 are processors controlling the entire SoC. A plurality of DSPs 124 and 134 may be provided. A plurality of CPUs 125 and 135 may be also provided. The external memory interfaces 126 and 136 are interfaces for performing communication to an external memory (not illustrated). An external memory is, for example, a DRAM (Dynamic Random Access Memory) and is used to store a large amount of data.

The camera interface 127 is an interface for coupling to the camera 11. The camera interface 127 may be, for example, an interface conformed to the MIPI standard, an LVTTL-IF for digital input, the EtherNet, or the like. The speaker control interface 137 is a control interface for the speaker 17 and may be an analog interface or a digital interface.

Figure 7:
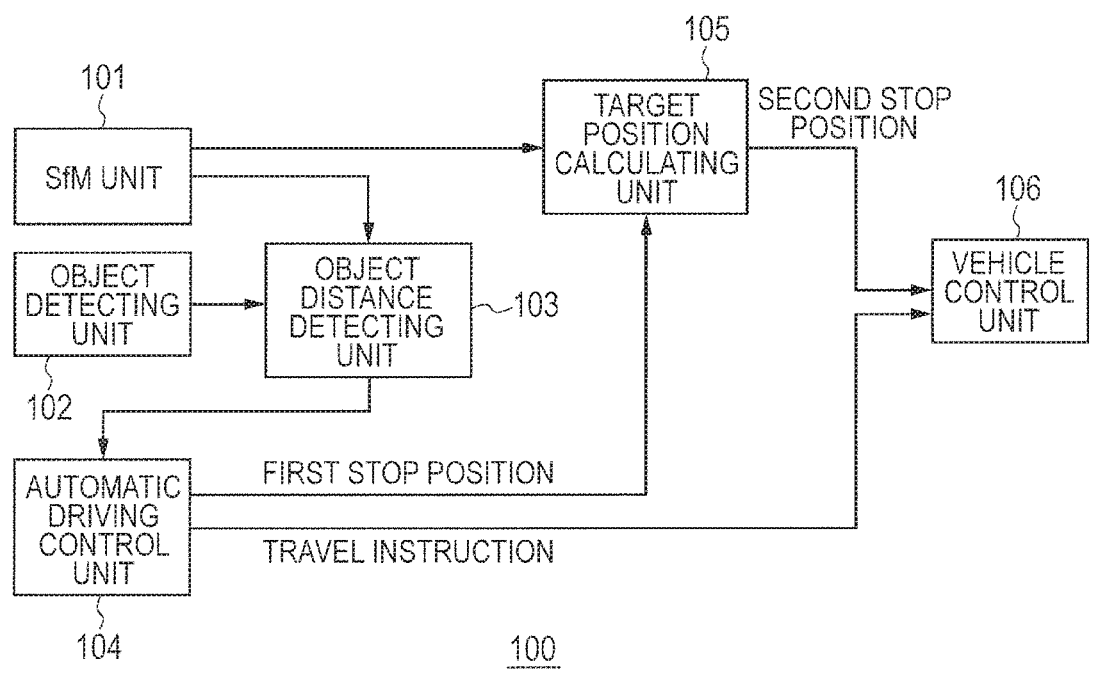
FIG. 7 is a block diagram illustrating an example of a functional configuration of the vehicle control system according to the first embodiment.

Next, the functional configuration of the vehicle control system 100 will be described. FIG. 7 is a block diagram illustrating an example of a functional configuration of the vehicle control system 100. As illustrated in FIG. 7, the vehicle control system 100 has an SfM unit 101, an object detecting unit 102, an object distance detecting unit 103, an automatic driving control unit 104, a target position calculating unit 105, and a vehicle control unit 106.

The elements illustrated in FIG. 7 are realized, for example, when the DSPs 124 and 134 or the CPUs 125 and 135 read and execute software (a computer program) stored in an arbitrary memory such as the local memories 122 and 132. That is, when a processor executes a program including an instruction group for performing processes which will be described later of the elements, the elements illustrated in FIG. 7 are realized. In such a manner, the vehicle control system 100 has the functions as a computer.

As an example, the SfM unit 101 and the object detecting unit 102 are realized in the camera ECU 12, and the object distance detecting unit 103, the automatic driving control unit 104, the target position calculating unit 105, and the vehicle control unit 106 are realized in the ECU 13. However, by another allocation to the camera ECU 12 and the ECU 13, the elements illustrated in FIG. 7 may be realized. Either the camera ECU 12 or the ECU 13 may realize all of the elements illustrated in FIG. 7. Although two ECUs of the camera ECU 12 and the ECU 13 are provided in the embodiment, by a single ECU obtained by combining them, the vehicle control system 100 may be configured.

The above-described program is stored by using any of non-transitory computer-readable media of various types and can be supplied to a computer. The non-transitory computer-readable media include tangible storage media of various types. Examples of the non-transitory computer-readable media include magnetic recording media (for example, flexible disk, magnetic tape, and hard disk drive), magnet-optic recording media (for example, magnet-optic disk), CD-ROM (Read Only Memory), CD-R, CD-R/W, and semiconductor memories (for example, mask ROM, PROM (Programmable ROM), EPROM (Erasable PROM), flash ROM, and RAM (Random Access Memory)). The program may be also supplied to a computer by any of transitory computer-readable media of various types. Examples of the transitory computer-readable media include an electric signal, an optical signal, and an electromagnetic wave. The transitory computer-readable medium can supply a program to a computer via a wired communication path such as an electric wire or an optical fiber or a wireless communication path.

The SfM unit 101 corresponds to the SfM unit 2 in FIG. 1 and detects the motion of an object captured and the distance from the captured object to the camera 11 on the basis of the image captured by the camera 11 by using the SfM algorithm. As the SfM algorithm is known, its details will not be described. In the embodiment, the SfM unit 101 detects the distance to an object on the basis of an image captured by the camera 11 when the vehicle travels. Therefore, the SfM unit 101 detects the distance to an object by using an image captured while the vehicle travels to a stop position (concretely, for example, the second stop position) and detects the distance to an object by using an image captured after the vehicle starts from the stop position (for example, the above-described second stop position).

By performing a predetermined image recognizing process on an image captured by the camera 11, the object detecting unit 102 identifies an object in the image. As the image recognizing process, a known arbitrary image recognizing process can be used. For example, the object detecting unit 102 identifies and detects an object by performing an image recognizing process using an HoG (Histogram of Gradient) characteristic amount and an SVM (Support Vector Machine).

The object distance detecting unit 103 detects the distance to a predetermined object. As described above, by the object detecting unit 102, an object in an image is identified. The object distance detecting unit 103 detects the distance to an object as a distance detection target by associating distance information obtained from the SfM unit 101 to an object corresponding to a predetermined object as a distance detection target in objects identified by the object detecting unit 102. In the detection of the distance by the SfM unit 101, the distance information of all of subjects in the image is obtained. Consequently, the object distance detecting unit 103 extracts a distance between a predetermined object (for example, human, car, sign, stop line, or the like) as the distance detection target and the vehicle (camera 11) from the distance information obtained from the SfM unit 101 by using the identification result of the object detecting unit 102.

The automatic driving control unit 104 generates travel instruction information for controlling the brake, accelerator, and steering by using the detection result of the object distance detecting unit 103 and, by the information, controls the automatic driving. Concretely, the automatic driving control unit 104 generates travel instruction information for travelling in a predetermined travel route by using, for example, information obtained from the object distance detecting unit 103 and information obtained by communication with external devices (for example, a traffic light, a sign, another car, or the like) performing communication with the car 10. The travel instruction information includes signals for controlling the brake, the accelerator, and the steering.

In the case of performing a control to stop the vehicle, the automatic driving control unit 104 outputs a first stop position satisfying a predetermined safety criterion. That is, the automatic driving control unit 104 corresponds to the first-stop-position output unit 3 in FIG. 1. When an arbitrary stop condition is satisfied while the vehicle is travelling, the automatic driving control unit 104 determines a stop position satisfying a predetermined safety criterion which is ahead of the present position of the vehicle as a first stop position. The arbitrary stop condition may be, for example, a stop signal by a traffic light, detection of an object which exists ahead in the travel direction and hinders travel, or an instruction from a user who rides on the vehicle.

In the case of performing a control of stopping the vehicle, the automatic driving control unit 104 generates travel instruction information for stopping the vehicle at the first stop position and outputs it to the vehicle control unit 106. In the case of performing the control of stopping the vehicle, the automatic driving control unit 104 outputs information indicating the first stop position to the target position calculating unit 105. In an example, the automatic driving control unit 104 determines a first stop position by using information of distance to a predetermined object (for example, a sign indicating a stop position such as a stop line)

detected by the object distance detecting unit 103 and generates travel instruction information for stopping the vehicle at the first stop position.

When the vehicle stops at the second stop position and, after that, a predetermined starting condition is satisfied, the automatic driving control unit 104 outputs travel instruction information instructing restart to the vehicle control unit 106. The automatic driving control unit 104 determines, for example, whether the present state of the vehicle is a restartable state or not. For example, when the vehicle stops at the second stop position by detecting a stop line as a sign which obligates temporary halt, after lapse of predetermined time since the halt, the vehicle becomes restartable. For example, in the case where the vehicle stops at a second stop position due to detection of an object, by detection that the object becomes absent, the vehicle becomes restartable. For example, when the user in the car 10 makes an operation instruction for a restart, a restartable state may be set.

When the present state of the vehicle becomes a restartable state, the automatic driving control unit 104 refers to profile state in which a travel condition at the time of restart is specified, and generates travel instruction information to perform restart under the travel condition specified in the profile information (for example, an acceleration condition specified in the profile information). The generated travel instruction information is notified to the vehicle control unit 106, thereby performing restart from the second stop position. When the restart from the second stop position is performed, detection of the distance to the object by the SfM unit 101 becomes possible. Therefore, before the vehicle reaches the first stop, the automatic driving control unit 104 can use a detection result of the distance by the SfM unit 101 for controlling the travel of the vehicle.

The target position calculating unit 105 corresponds to the second-stop-position calculating unit 4 in FIG. 1 and calculates the second stop position closer than the first stop position output by the automatic driving control unit 104. The target position calculating unit 105 calculates the position closer than the first stop position only by a predetermined distance "d" (that is, the position closer to the vehicle than the first stop position only by the distance "d") as the second stop position. The distance "d" may be a movement distance by which detection of distance by the SfM unit 101 becomes possible. The distance "d" is a value determined on the basis of the used SfM algorithm, a condition of the camera 11, and the like and is, for example, a few centimeters to tens centimeters.

The target position calculating unit 105 may correct the calculated second stop position on the basis of a result of the detection by the SfM unit 101. In this case, concretely, the target position calculating unit 105 corrects the second stop position as the position closer than the first stop position only by the distance "d". For example, in the case where a mobile object exists in a preliminary section or its periphery, the target position calculating unit 105 may correct the second stop position so as to be apart from the object only by a predetermined distance. In this case, the corrected second stop position deviates front or behind from the stop position which is before the correction. The target position calculating unit 105 may correct the second stop position on the basis of the distance of the object output from the object distance detecting unit 103. In such a manner, by correcting the second stop position, safety at the time of travel in the preliminary section by the restart after stopping at the second stop position can be further increased.

The target position calculating unit 105 outputs the calculated second stop position (in the case where correction is made, the corrected second stop position) to the vehicle control unit 106.

According to the travel instruction information output from the automatic driving control unit 104, the vehicle control unit 106 controls each of the brake, the accelerator, and the steering. That is, the vehicle control unit 106 outputs a control signal to each of the brake ECU 14, the throttle ECU 15, and the steering ECU 16. When the second stop position is notified from the target position calculating unit 105, the vehicle control unit 106 controls so as to stop the vehicle not at the first stop position but at the second stop position. The automatic driving control unit 104 and the vehicle control unit 106 correspond to the control unit 5 in FIG. 1.

Figure 8:
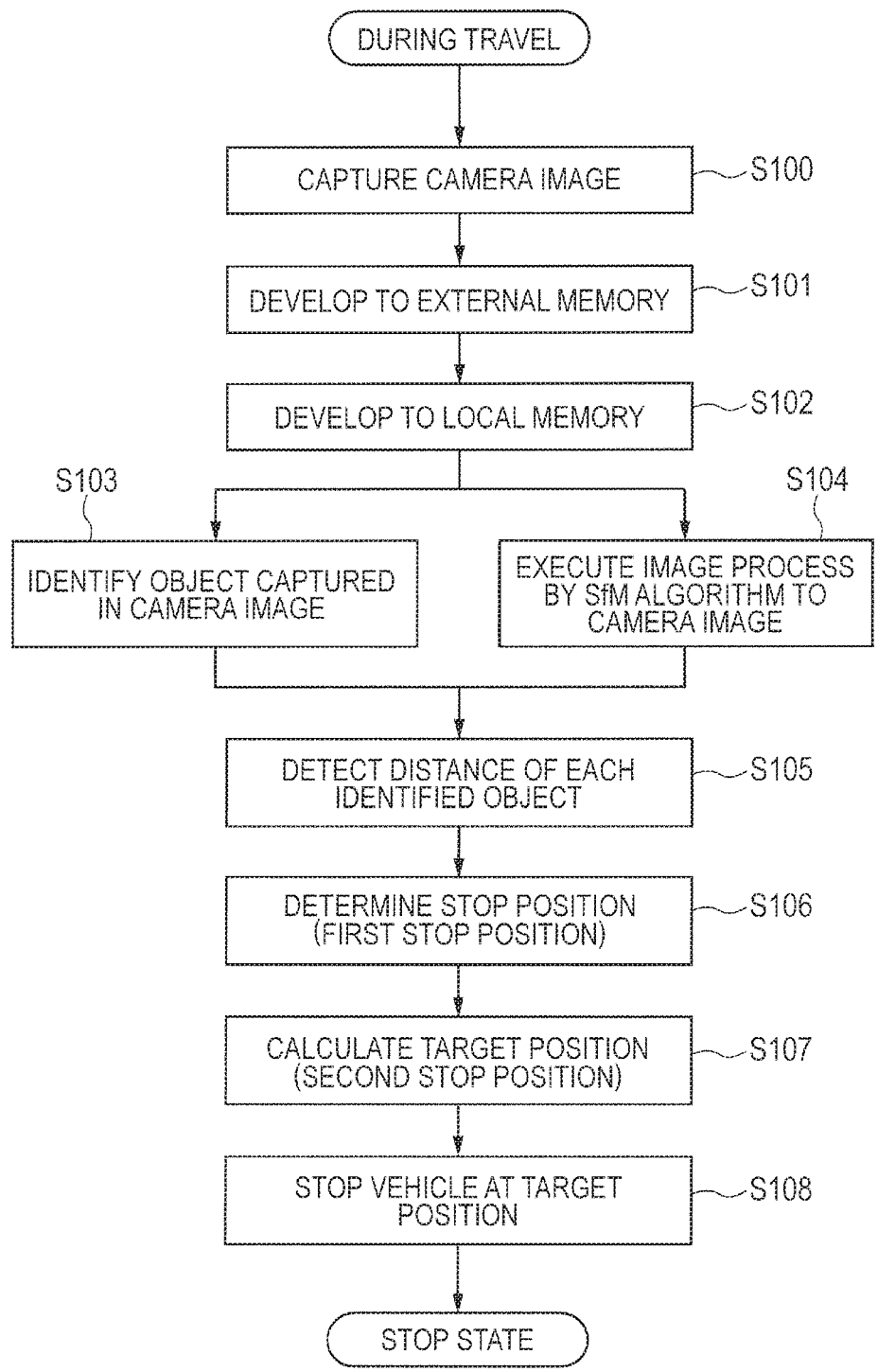
FIG. 8 is a flowchart illustrating an example of operation of the vehicle control system according to the first embodiment when a car which is traveling stops.

Next, an operation example of the vehicle control system 100 will be described. FIG. 8 is a flowchart illustrating an example of operation of the vehicle control system 100 when the car 10 which is traveling stops. Hereinbelow, description will be given with reference to FIG. 8.

In step 100 (S100), the camera ECU 12 takes an image captured by the camera 11. In step 101 (S101), the camera ECU 12 develops the taken image to an external memory (not illustrated) via the external memory interface 126. Further, in step 102 (S102), the camera ECU 12 extracts a region corresponding to a process unit of the image process from the image stored in the external memory and develops it in the local memory 122.

Next, the processes in steps 103 and 104 are performed. In the flowchart of FIG. 8, the process of the step S103 and the process of the step S104 are performed in parallel. Alternatively, after one of the processes, the other process may be performed.

In the step 103 (S103), the object detecting unit 102 identifies an object in the image. In the step 104 (S104), the SfM unit 101 performs an image process according to the SfM algorithm on the image.

In step 105 (S105), the object distance detecting unit 103 detects the distance information for each of identified objects on the basis of the identification result obtained in the step 103 and the distance information obtained in the step 104.

In step 106 (S106), the automatic driving control unit 104 determines the first stop position. The automatic driving control unit 104 determines the first stop position on the basis of, for example, the detection result in the step 105. The automatic driving control unit 104 generates travel instruction information for stopping the vehicle at the first stop position.

In step 107 (S107), the target position calculating unit 105 calculates the second stop position closer than the first step position determined in the step 106. As described above, the target position calculating unit 105 corrects the calculated second stop position as necessary.

In step 108 (S108), the vehicle control unit 106 controls so that the vehicle stops at the second stop position output from the target position calculating unit 105.

By the above steps, the car 10 stops at the second position closer than the first stop position.

Figure 9:
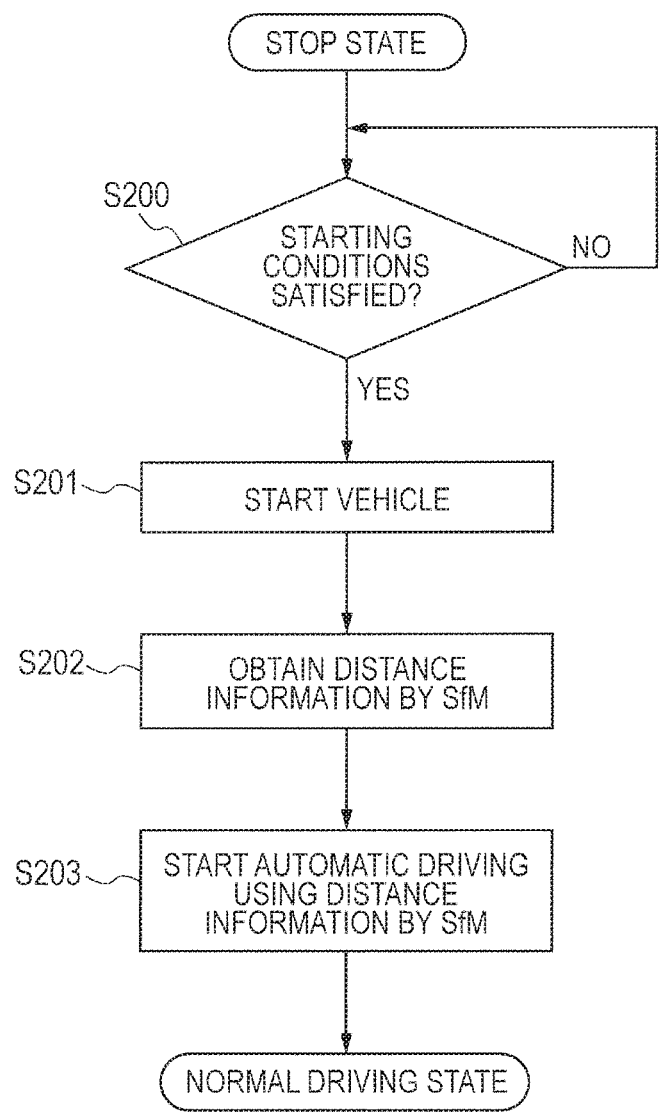
FIG. 9 is a flowchart illustrating an example of the operation of the vehicle control system according to the first embodiment when the stopped car starts again.

Next, the operation of the vehicle control system 100 at the time when the car 10 restarts from the second stop position will be described. FIG. 9 is a flowchart illustrating an example of the operation of the vehicle control system 100 when the car 10 which is being stopped starts again. Hereinafter, the description will be given with reference to FIG. 9.

In step 200 (S200), the automatic driving control unit 104 determines whether a predetermined starting condition is satisfied or not. The step 200 is repeated (No in the step 200) until the predetermined starting condition is satisfied. When the predetermined starting condition is satisfied, the program shifts to step 201.

In the step 201 (S201), the automatic driving control unit 104 makes the vehicle start. Specifically, the automatic driving control unit 104 outputs travel instruction information instructing restart to the vehicle control unit 106. The vehicle control unit 106 controls travel on the basis of the travel instruction information.

In step 202 (S202), when the car 10 travels only by movement distance by which the distance detection by the SfM unit 101 becomes possible, acquisition of distance information using the SfM algorithm becomes possible.

In step 203 (S203), when the distance information using the SfM algorithm is obtained, the automatic driving control unit 104 starts the automatic driving control using the distance information. That is, a normal driving state is realized. At this time point, the car 10 is in the preliminary section and is not beyond the first stop position.

The operation of the car 10 controlled by the vehicle control system 100 will be described. FIG. 10 is a diagram illustrating an operation example of the car 10 whose travel is controlled by the vehicle control system 100 according to the embodiment and an operation example of the car whose travel is controlled by a vehicle control system according to a comparative example. FIG. 10 illustrates the difference of the operations by the graph illustrating the time change of the speed of the car. It is assumed here that, in a state where the vehicle travels at speed S1, the control of stopping at the first stop position starts at time T1, and the start operation starts at time T4. The graph illustrates an example of decelerating at predetermined acceleration (deceleration) at the time of stop.

In the vehicle control system according to the comparative example, at time T1, the control for stopping at the first stop position is performed. Consequently, the car decelerates at acceleration (deceleration) for stopping at the first stop position, and stops at the first stop position at time T3. At time T4, the car starts from the first stop position. Therefore, in the vehicle control system according to the comparative example, a state occurs such that the vehicle travels beyond the first stop position while the distance detection by the SfM algorithm cannot be performed.

On the other hand, in the vehicle control system 100 according to the embodiment, the control for stopping at the second stop position is performed. Consequently, the car 10 decelerates at acceleration (deceleration) for stopping at the second stop position, and stops at the second stop position at time T2. At time T4, the car starts from the second stop position. Therefore, the car 10 travels in the preliminary section immediately after the restart. Referring to FIG. 10, the car 10 travels in the preliminary section for the period from time T4 to time T5. Consequently, before the first stop position, detection of the distance to the object by using the SfM algorithm can be performed. That is, before the first stop position, the automatic driving control unit 104 can realize the automatic driving state using the distance detection result by the SfM unit 2.

In the case where the first stop position which is determined once is changed by some reason (for example, detection of a new object), the target position calculating unit 105 updates the second stop position in accordance with the change. FIG. 11 is a graph illustrating an operation example of the car 10 in the case where the first stop position is changed to a position closer than the original first stop position. On precondition that deceleration is performed at predetermined acceleration, the stop time at the updated first stop position becomes time T3' before time T3, and the stop time at the updated second stop position becomes time T2' before the time T2. Therefore, the car 10 controlled by the vehicle control system 100 according to the embodiment starts deceleration at the time T1 and stops at the second stop position at the time T2' before the time T2. At time T4, the car 10 starts from the second stop position.

Although FIG. 11 illustrates an operation example of the car 10 in the case where the first stop position is changed to a position closer than the original first stop position, the operation is similar also in the case where the first stop position is changed forward of the original first stop position. FIG. 12 is a graph illustrating an operation example of the car 10 in the case where the first stop position is changed to a position forward of the original first stop position. On precondition that deceleration is performed at predetermined acceleration, stop time in the case of stopping in the updated first stop position becomes time T3' later than the time T3, and stop time in the case of stopping in the updated second stop position becomes time T2' later than the time T2. Therefore, the car 10 controlled by the vehicle control system 100 according to the embodiment starts deceleration from the time T1, stops at the second stop position at the time T2' later than the time T2, and starts from the second stop position at the time T4.

Second Embodiment

Next, a second embodiment will be described. The second embodiment is different from the first embodiment with respect to the point of monitoring whether an object exists around the car 10 or not when the car 10 stops at the second stop position.

Figure 13:
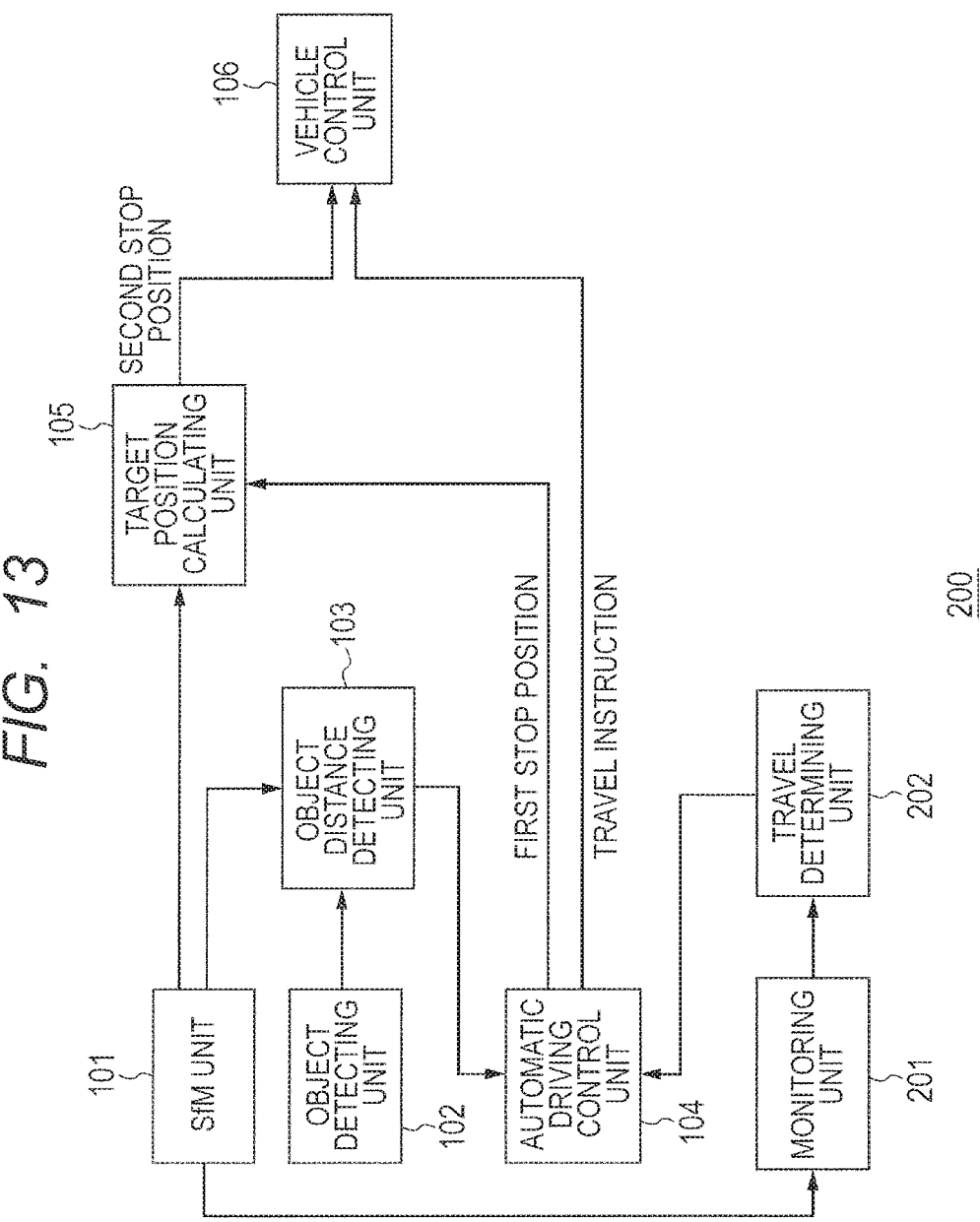
FIG. 13 is a block diagram illustrating an example of a functional configuration of a vehicle control system according to a second embodiment.

FIG. 13 is a block diagram illustrating an example of a functional configuration of a vehicle control system 200 according to the second embodiment. The vehicle control system 200 illustrated in FIG. 13 is different from the vehicle control system 100 illustrated in FIG. 7 with respect to the point that a monitoring unit 201 and a travel determining unit 202 are added. Hereinafter, the configuration and operation of the vehicle control system 200 will be described but repetitive description will not be given.

The monitoring unit 201 monitors whether an object exists in the periphery of the car 10 or not during the car 10 stops. In the embodiment, the monitoring unit 201 monitors whether an object exists in the periphery of the car 10 or not on the basis of an output from the SfM unit 101. Consequently, in the embodiment, the SfM unit 101 executes an image process using the SfM algorithm also after the car 10 stops at the second stop position. More specifically, in the embodiment, the SfM unit 101 performs the image process using the SfM algorithm on an image captured by the camera 11 and detects a motion in the image since the car 10 stops at the second stop position until a predetermined starting condition is satisfied. The SfM unit 101 outputs a motion of each pixel in the image. Since the SfM unit 101 performs the image process also when the car 10 stops at the second stop position, in the embodiment, the SfM unit 101 performs the process using the SfM algorithm during travel until stop at the second stop position, during stop, and after start from the second stop position.

The monitoring unit 201 determines the presence of an object on the basis of the motion detected by the SfM unit 101. When the SfM unit 101 detects a motion in an image during stop of the car 10, it means that a mobile object exists within the imaging range of the camera 11. Therefore, when a motion is detected by the SfM unit 101, the monitoring unit 201 determines that a mobile object exists in the periphery of the car 10, more concretely, the imaging range of the camera 11.

On the basis of the motion detection result by the SfM unit 101, the monitoring unit 201 determines the existence position of the mobile object. Concretely, first, the monitoring unit 201 determines the size in the image of the moved object on the basis of the motion in each pixel detected by the SfM unit 101. The detection result of the SfM unit 101 indicates the direction of the motion and the size of the motion in each pixel. In the case where a plurality of adjacent pixels make the same motion (that is, move in the same direction), it can be considered that the pixels correspond to the same mobile object. Consequently, the monitoring unit 201 identifies a group of pixels which make the same motion by an algorithm such as labelling. The size of the pixel group is inversely proportional to the distance between the camera 11 and the mobile object. Therefore, the monitoring unit 201 determines the size of the pixel group. In such a manner, the size in the image of the object moved is determined.

On the basis of the determined size, the monitoring unit 201 determines whether the existence position of the moved object lies within a predetermined range from the car 10 or not. For example, when the size in the image of the moved object is equal to or larger than a predetermined threshold, that is, when the number of pixels in the pixel group is equal to or larger than the predetermined threshold, the monitoring unit 201 determines that the existence position of the moved object lies in a predetermined range from the car 10. The predetermined range may be a preliminary section. In this case, the monitoring unit 201 determines whether an object exists in the preliminarily section or not. The monitoring unit 201 outputs the monitor result to the travel determining unit 202.

When the monitoring unit 201 determines that no object exists around the car 10, the travel determining unit 202 notifies the automatic driving control unit 104 of a travelable state. More concretely, when the monitoring unit 201 determines that no object exists within a predetermined range, the travel determining unit 202 notifies the automatic driving control unit 104 of a travelable state.

When a predetermined starting condition is satisfied and the monitoring unit 201 determines that no object exists around the car 10, the automatic driving control unit 104 starts the car 10. More concretely, when a predetermined starting condition is satisfied and the monitoring unit 201 determines that no object exists within a predetermined range, the automatic driving control unit 104 starts the car 10. That is, when a predetermined starting condition is satisfied and a notification indicating a travelable state is received from the travel determining unit, the automatic driving control unit 104 outputs travel instruction information instructing restart to the vehicle control unit 106.

Although the monitoring unit 201 monitors an object by using a result of the motion detection of the SfM unit 101 in the embodiment, the invention is not limited to the motion detection. The monitoring unit 201 may monitor the existence of an object during a stop by an arbitrary method. For example, the monitoring unit 201 may monitor the existence of an object by using, not a motion detection result of the SfM unit 101 but a distance detection result of the SfM unit 101. In this case, the monitoring unit 201 can determine whether the existence position of a moved object is within a predetermined range from the car 10 or not on the basis of distance of the moved object detected by the SfM unit 101. Alternatively, the monitoring unit 201 may monitor the presence/absence of an object by a detection mechanism different from the SfM unit 101.

Figure 14:
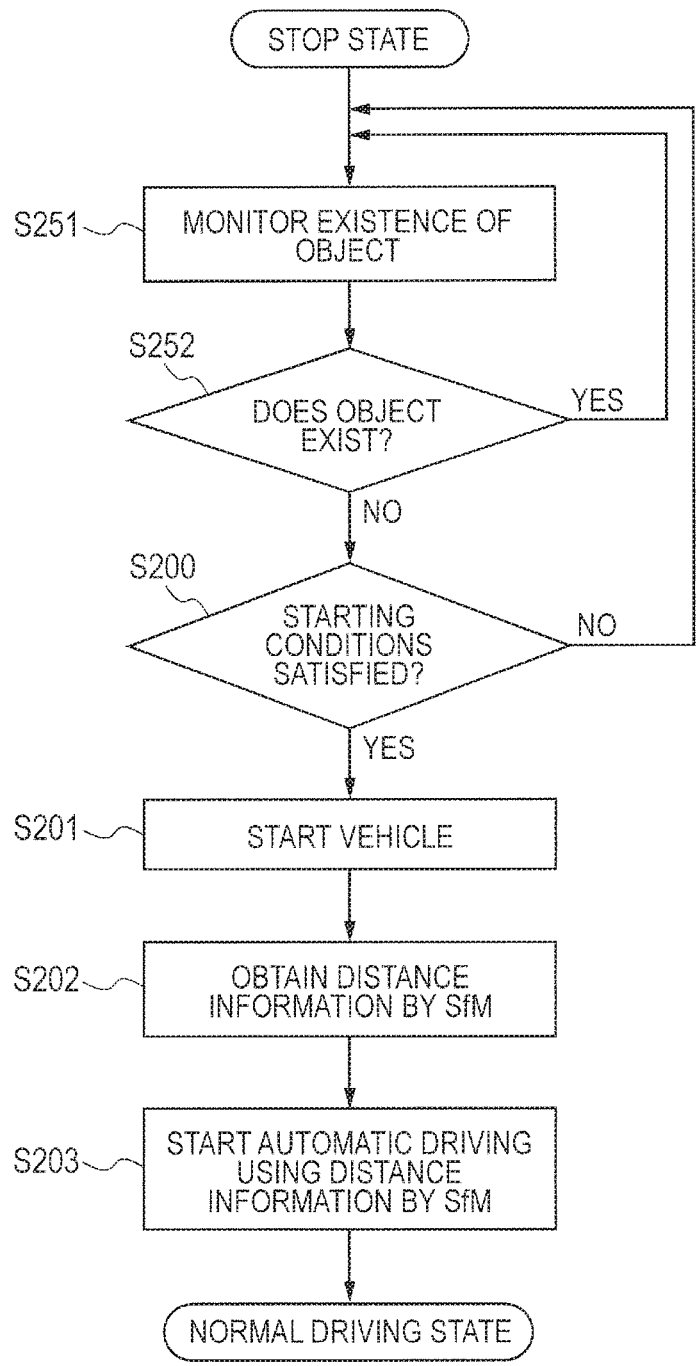
FIG. 14 is a flowchart illustrating an example of the operation of the vehicle control system according to the second embodiment when a stopped car starts again.

Next, the operation of the vehicle control system 200 when the car 10 restarts from the second stop position will be described. FIG. 14 is a flowchart illustrating an example of the operation of the vehicle control system 200 when the stopped car 10 starts again. The flowchart illustrated in FIG. 14 is different from the flowchart illustrated in FIG. 9 with respect to the point that steps 251 and 252 are added.

In the vehicle control system 200 according to the second embodiment, first, the monitoring unit 201 monitors the existence of an object in step 251 (S251). In step 252 (S252), the monitoring unit 201 determines whether an object exists around the car 10 or not. On the basis of the determination result, the travel determining unit 202 determines whether the travelable state is notified to the automatic driving control unit 104 or not. When the monitoring unit 201 determines that an object exists (Yes in the step 252), the monitoring of an object is continued. On the contrary, when the monitoring unit 201 determines that no object exists around the car 10 (No in the step 252), the process shifts to step 200. When whether the starting condition is satisfied or not is determined and it is not satisfied in the step 200, the monitoring of an object is continued. When the starting condition is satisfied, the process shifts to the step S201. Processes after shift to the step S201 are similar to those in the vehicle control system 100 according to the first embodiment.

The operation of the car 10 controlled by the vehicle control system 200 will now be described. FIG. 15 is a diagram illustrating an operation example of the car 10 whose travel is controlled by the vehicle control system 200 according to the embodiment and an operation example of a car whose travel is controlled by a vehicle control system according to a comparison example. As understood from comparison between FIGS. 15 and 10, in the embodiment, after stop at the second stop position in time T2, monitoring of the presence/absence of an object by the monitoring unit 201 is performed.

Also in the embodiment, when the first stop position which is determined once is changed by any factor (for example, detection of a new object), the target position calculating unit 105 updates the second stop position in accordance with the change. FIG. 16 is a graph illustrating an operation example of the car 10 in the case where a first stop position is changed to a position closer to the original first stop position. FIG. 17 is a graph illustrating an operation example of the car 10 in the case where the first stop position is changed to a position further than the original first stop position. In the case where the first stop position which is determined once is changed, as illustrated in FIG. 16 or 17, monitoring of the monitoring unit 201 is performed from time T2'.

The second embodiment has been described above. In the vehicle control system 200 according to the embodiment, whether or not an object exists around the car 10 while the car 10 stops is monitored. When a predetermined starting condition is satisfied and it is determined that no object exists around the car 10, the car 10 is started. That is, when an object exists, starting is suppressed. Consequently, safer automatic driving can be realized. In the embodiment, in the monitoring unit 201, when the existence position of an object lies within a predetermined range from the car 10, starting is suppressed. Consequently, unnecessary starting suppression does not occur.

Third Embodiment

Next, a third embodiment will be described. The third embodiment is different from the second embodiment with respect to the point that when the car 10 stops at the second stop position and an object exists around the car 10, a predetermined output is performed by a speaker. Hereinafter, the point different from the second embodiment will be described.

In the third embodiment, when it is determined that an object exists around the car 10, the monitoring unit 201 also performs a predetermined output by the speaker 17. An output by the speaker 17 may be an alarm to the outside of the car 10 or an alarm to the inside of the car 10. For example, an alarm to the inside of the car may be a sound output notifying a state that starting is suppressed due to the existence of an object. An alarm to the outside of the car may be a sound output urging exit from the periphery of the car 10.

In the embodiment, when an object intruded in the periphery of the car 10 is a human, an alarm to the outside of the car is performed. For this purpose, the monitoring unit 201 determines the shape in an image of a moved object on the basis of the motion in each pixel detected by the SfM unit 101 and, in the case where the determined shape is a predetermined shape, sends a predetermined output to the outside of the car 10 by the speaker 17. For example, when the determined shape is a vertically-long shape, the monitoring unit 201 identifies that the object is a human and outputs sound to the outside. The method of determining whether an object is a human or not is not limited to the above. For example, a result of identification by the object detecting unit 102 may be used. That is, when the object detecting unit 102 identifies that an object existing around the car 10 is a human, the monitoring unit 201 may send a predetermined output to the outside of the car 10 by the speaker 17.

Figure 18:
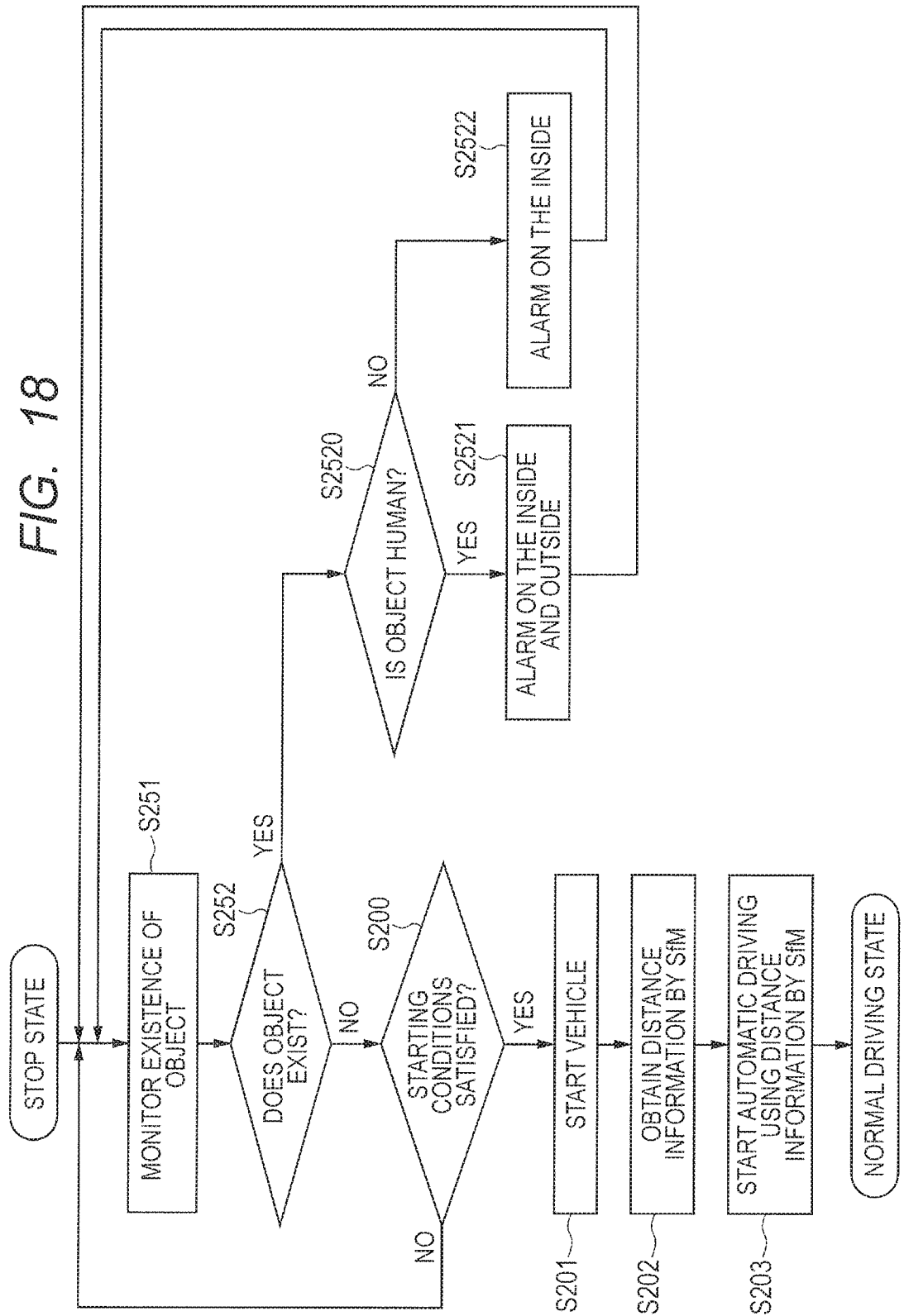
FIG. 18 is a flowchart illustrating an example of the operation of a vehicle control system according to a third embodiment when a stopped car starts again.

Next, the operation of the vehicle control system 200 of the embodiment when the car 10 restarts from the second stop position will be described. FIG. 18 is a flowchart illustrating an example of the operation of the vehicle control system 200 when the car 10 which stops starts again. The flowchart of FIG. 18 is different from that of FIG. 14 with respect to the point that steps 2520, 2521, and 2522 are added. The steps 2520 to 2522 are processes performed in the case where the presence of an object is determined in the step 252.

In the embodiment, when the presence of an object is determined by the monitoring unit 201 in the step 252 (Yes in the step 252), the process shifts to the step 2520.

In the step 2520 (S2520), whether an existing object is a human or not is determined. When the object is a human (Yes in the step 2520), the process shifts to the step 2521. When the object is not a human (No in the step 2520), the process shifts to the step 2522.

In the step 2521 (S2521), the monitoring unit 201 sends a predetermined voice output to the outside and inside of the car 10. Specifically, the monitoring unit 201 gives an alarm to a human around the car 10 and gives an alarm to the user who rides on the car 10. On the other side, in the step 2522 (S2522), the monitoring unit 201 sends a predetermined sound output only to the inside of the car 10. After the sound output in the step 2521 or 2522 is sent, the monitoring of an object is continued.

The third embodiment has been described above. In the vehicle control system 200 according to the embodiment, when an object exists around the car 10, a predetermined output is sent by the speaker 17. Therefore, a proper alarm can be generated. Particularly, when an object is a human, an alarm is given to the outside of the car 10. Consequently, a predetermined alarm such as sound which urges movement can be sent to the human.

Although the present invention achieved by the inventors herein has been concretely described above on the basis of the embodiments, obviously, the invention is not limited to the embodiments and can be variously changed without departing from the gist. For example, although the camera 11 is a monocular camera provided in a front part of the car 10 so as to capture images ahead of the car 10, it is sufficient to provide the camera 11 for the car 10 to capture images in the movement direction of the car 10 and may be, for example, a monocular camera provided in a rear part of the car 10 to capture rearward images. In this case, the above-described control is performed when the car 10 travels rearward or stops. The camera 11 may be one of cameras configuring a surround camera system capturing images around the car 10. With such a configuration, in the car 10 on which a surround camera system is mounted, without adding the camera 11, the above-described control can be realized.

What is claimed is:

1. A vehicle control system comprising:
an SfM unit configured to receive forward images in a movement direction of a vehicle imaged by a monocular camera;
a first-stop-position output unit configured to obtain a first stop position where the vehicle is to stop according to 1) a traffic sign of a road the vehicle is traveling or 2 an instruction from the vehicle;
a second-stop-position calculating unit configured to set a second stop position. based on the first stop position obtained by the first-stop-position output unit, wherein the second stop position is set closer to the vehicle than the first stop position; and
a control unit configured to control the vehicle to stop at the second stop position instead of the first stop position,
the control unit further configured to control the vehicle to start moving from the second stop position towards the first stop position after the vehicle stops at the second stop position and when a predetermined starting condition is satisfied,
wherein, after the vehicle starts moving from the second stop position and prior to the vehicle arriving at the first stop position;
the SfM unit further configured to detect, based on the received forward images, an object disposed in front of the vehicle and beyond the first stop position based on a change in a relative distance between the vehicle and the object using an SfM algorithm, the change in the relative distance being caused by the vehicle moving from the second stop position toward the first stop position, and
the control unit further configured to control the vehicle to stop before the vehicle reaches the first stop position or at the first stop position in response to the SIM unit detecting the object after the vehicle starts moving from the second stop position and prior to the vehicle arriving at the first stop position.

2. The vehicle control system according to claim 1, wherein when the SfM unit detects that an object exists between the first stop position and the calculated second stop position before the vehicle reaches the second stop position, the second-stop-position calculating unit is further configured to correct the calculated second stop position with a corrected second stop position closer to the vehicle than the calculated second stop position based on a result of detection by the SfM unit.

3. The vehicle control system according to claim 1, further comprising a monitoring unit configured to monitor whether or not at least one or more objects exists around the vehicle while the vehicle is stopped,
the SfM unit further configured to detect a motion in an image by using the SfM algorithm on images captured by the monocular camera until the predetermined starting condition is satisfied after stop at the second stop position, and
the monitoring unit further determining, based on the motion detected by the SfM unit, the existence of the at least one or more objects.

4. The vehicle control system according to claim 3, wherein when the predetermined starting condition is satisfied and the monitoring unit determines that no object exists around the vehicle, the control unit starts moving the vehicle.

5. The vehicle control system according to claim 4, wherein the monitoring unit determines a size in an image of a moved object based on a motion of each pixel detected by the SfM unit and determines whether the existence position of the moved object is within a predetermined range from the vehicle or not based on the determined size.

6. The vehicle control system according to claim 5, wherein the monitoring unit determines whether the existence position of the moved object is within a predetermined range from the vehicle or not based on the distance to the moved object detected by the SfM unit.

7. The vehicle control system according to claim 3, further comprising a speaker, wherein when the existence of the at least one or more objects around the vehicle is determined, the monitoring unit is further configured to generate a predetermined output to be output by the speaker.

8. The vehicle control system according to claim 7, wherein the monitoring unit determines a shape of the moved object in the image based on motion in each pixel detected by the SfM unit, and
wherein when the determined shape is a predetermined shape, the monitoring unit generates a predetermined output to be output to outside of the vehicle by the speaker.

9. The vehicle control system according to claim 7, further comprising an object detecting unit configured to perform a predetermined image recognizing process on the forward images captured by the monocular camera and identifying the object in the forward images,
wherein when the object is identified as a human by the object detecting unit, the monitoring unit generates the predetermined output to be output to the outside of the vehicle by the speaker.

10. The vehicle control system according to claim 1, further comprising the monocular camera.

11. The vehicle control system according to claim 1, wherein the monocular camera is one of cameras configuring a surround camera system imaging a periphery of the vehicle.

12. The vehicle control system according to claim 1, wherein, even if the object is stationary, the SfM unit detects the object before the vehicle reaches the first stop position based on the change in the relative distance caused by the vehicle moving from the second stop position toward the first stop position.

13. A vehicle control method comprising the steps of:
receiving forward images in a movement direction of a vehicle image by a monocular camera;
obtaining a first stop position where the vehicle is to stop according to 1) a traffic sign of a road the vehicle is traveling or 2) an instruction from the vehicle;
calculating a second stop position based on the obtained first stop position such that the second stop position is set closer to the vehicle than the first stop position;
controlling the vehicle to stop at the second stop position instead of the first stop position;
after the vehicle stops at the second stop position and when a predetermined starting condition is satisfied, controlling the vehicle to start moving from the second stop position towards the first stop position;
after the vehicle starts moving from the second stop position and prior to the vehicle arriving at the first stop position, detecting an object disposed in front of the vehicle and beyond the first stop position based on a change in a relative distance between the vehicle and the object using an SfM algorithm, the change in the relative distance being caused by the vehicle moving from the second stop position toward the first stop position; and
in response to detecting the object after the vehicle starts moving from the second stop position and prior to the vehicle arriving at the first stop position, controlling the vehicle to stop before the vehicle reaches the first stop position or at the first stop position.

14. A computer readable storage medium storing an instruction group that causes, when executed by a computer, the computer to perform the method according to claim 13.

* * * * *